United States Patent [19]
Pearce

[11] Patent Number: 6,109,376
[45] Date of Patent: Aug. 29, 2000

[54] FACE SEAL HAVING STRAIN INDUCED FACE GEOMETRY

[75] Inventor: David E. Pearce, Houston, Tex.

[73] Assignee: Camco International Inc., Houston, Tex.

[21] Appl. No.: 09/196,478

[22] Filed: Nov. 19, 1998

Related U.S. Application Data

[60] Provisional application No. 60/066,293, Nov. 25, 1997.

[51] Int. Cl.$^7$ ................................................ E21B 10/22
[52] U.S. Cl. ........................................ 175/371; 277/400
[58] Field of Search .................................. 175/371, 372, 175/227, 228; 277/336, 399, 400, 403

[56] References Cited

U.S. PATENT DOCUMENTS

| | | |
|---|---|---|
| 3,761,145 | 9/1973 | Schumacher, Jr. . |
| 4,212,475 | 7/1980 | Sedy . |
| 4,248,485 | 2/1981 | White et al. .................. 175/371 X |
| 4,610,319 | 9/1986 | Kalsi . |
| 4,836,561 | 6/1989 | Lebeck et al. . |
| 4,838,365 | 6/1989 | Kotch . |
| 4,842,286 | 6/1989 | Heilala . |
| 4,887,395 | 12/1989 | Lebeck et al. . |
| 5,027,911 | 7/1991 | Dysart .................................. 175/371 X |
| 5,040,624 | 8/1991 | Schumacher et al. . |
| 5,195,754 | 3/1993 | Dietle ........................................ 277/27 |
| 5,201,531 | 4/1993 | Lai . |
| 5,230,520 | 7/1993 | Dietle et al. ............................ 277/134 |
| 5,487,550 | 1/1996 | Salant et al. . |
| 5,496,047 | 3/1996 | Goldswain et al. . |

*Primary Examiner*—Frank Tsay
*Attorney, Agent, or Firm*—Jeffery E. Daly

[57] ABSTRACT

A mechanical seal for rotary rock bits with a uniquely formed hydrodynamic wave geometry on the sealing faces. The sealing faces are first manufactured flat and smooth, then upon assembly are elastically deformed into a hydrodynamic geometry by an energizing system. After a smooth flat sealing surface is formed, the mechanical seal face elastically deforms into a hydrodynamic wave geometry. The typical deformation has a magnitude greater than about three helium light bands more than the original surface. The region of the sealing surface at the outer periphery of the seal does not have a wave geometry. Rather the portion of the seal face at the periphery is flat and parallel to its mating seal ring to exclude abrasives and eliminate lubricant leakage.

16 Claims, 4 Drawing Sheets

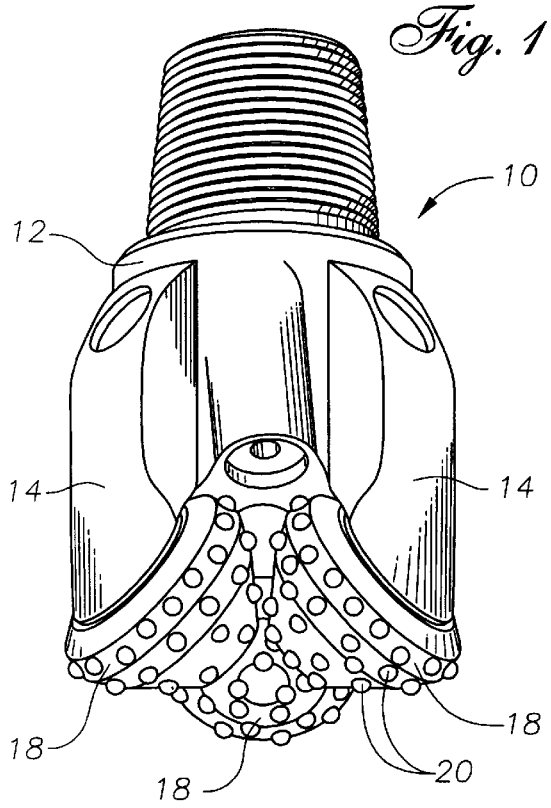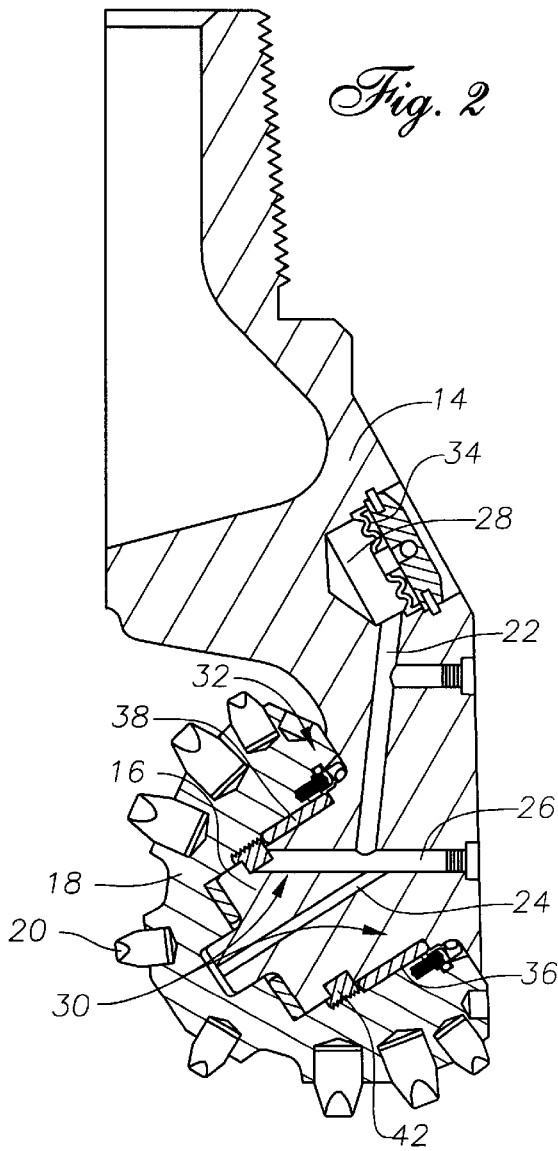

FACE SEAL HAVING STRAIN INDUCED FACE GEOMETRY

This application claims benefit of Provisional Appl. 60/066,293 filed Nov. 25, 1997.

BACKGROUND OF THE INVENTION

1. Field of the Invention

This invention provides an enhanced rotary face seal design for roller cone rock bits. The new seal is elastically deformed at assembly to form a hydrodynamic wave geometry on the sealing interface. This wave geometry extends the seal life by enhancing the lubrication of the seal face.

2. Description of the Related Art

Rotary mechanical face seals are generally made up of two flat sealing faces which are designed to maintain a thin film of lubricant between the sealing faces. This lubricant film helps minimize the asperity contact of the two sealing surfaces and therefore prolongs seal life. Maintaining this lubricant film is particularly important in face seals for rotary drilling bits due to the unusually severe operating environment. As the sealing surfaces rotate relative to each other, they are urged together at a carefully controlled force by one or more energizers as shown, for instance, in U.S. Pat. Nos. 5,040,624; 4,838,365; and 3,761,145. It is of paramount importance to maintain a consistent lubricant film thickness between the two sealing faces. If the film becomes too thick, the ability to seal a pressure differential will be compromised. If the film becomes too thin, frictional contact between the sealing faces will cause failure due to excessive face wear and/or overheating. In addition, because the seal is maintained between a lubricant and an abrasive laden liquid, it is important that the lubricant, rather than the abrasive laden liquid, remains between the faces. The present invention uses a novel, hydrodynamic sealing interface to sustain the lubricant film between the sealing faces.

An example of a rotary rock bit seal which uses hydrodynamic lubrication is explained in detail by Kalsi in U.S. Pat. No. 4,610,319. In this elastomeric packing ring type seal, compression is maintained in a radial direction such that the sealing interface is a cylindrical surface of a selected width at the internal diameter of the seal. The seal is designed and molded with a wave geometry formed adjacent to the sealing interface at the lubricant side. This wave acts as a pump to force lubricant across the sealing interface and out of the bit at a controlled rate. The film thickness, operating temperature, and leakage rate across the sealing interface are a function of the wave geometry, the seal rpm, and the lubricant viscosity, along with other factors such as the radial compression on the seal, and the physical properties of the elastomer.

Although these hydrodynamic type packing ring elastomer seals have enjoyed commercial success in rock drilling bits, the seals are subject to thermal, chemical, and mechanical degradation when used in very severe drilling environments. Also, because the seal is designed to pump lubricant out of the bit, there is a danger that the supply of lubricant will be depleted before the bearing wears out.

Due to the operating limitations of elastomers as dynamic seals, mechanical face seals have become the seal of choice for rock bits used in the most severe drilling environments. Mechanical face seals are typically manufactured from materials which readily tolerate the thermal, chemical and mechanical attack of severe drilling environments. The seals provide a higher level of reliability than elastomer seals in rock bits and are capable of extremely long runs without significant loss of lubricant.

Although generally more expensive than elastomer seals, mechanical face seals are able to assure a level of performance in rock drilling bits which easily justifies the higher cost. Most mechanical face seals used in rotary rock bits are made from stainless steels and have sealing faces which are manufactured with a flatness of less than 6 helium light bands and a roughness of less than 5 micro inches RA. These faces mate together to form a planar, annular sealing interface which extends from a distinct outer diameter to a distinct inner diameter, defining a contact width. These seals are usually made with one or two sealing rings with a conical, spherical, or otherwise gradually tapered shape adjacent to the sealing interface at the lubricant side. This creates a diverging geometry which provides preferential access for lubricant to enter into the sealing interface. As abrasives wear the outer periphery of the sealing interface, the diverging geometry also facilitates inward movement of the sealing interface to maintain contact width.

Delivery of lubricant to and across the sealing interface can be enhanced by adding a wave geometry or other hydrodynamic form to one or both of the seal faces adjacent to the sealing interface at the lubricant side, as shown in U.S. Pat. Nos. 4,836,561; 5,201,531; and 5,487,550.

While these geometric modifications may serve to enhance seal lubrication, they can be difficult and costly to manufacture. Because the seal's hydrodynamic behavior is very sensitive to the shape and height of the waves, small variations in the wave's manufacture may cause considerable variation in the seal's performance. The sealing interface and adjacent areas in rock bit face seals are normally polished to a surface roughness of 1 to 5 micro-inches RA. Manufacturing an interrupted or wavy surface with this surface finish is technically difficult and therefore very costly. In addition, external contaminants usually cause wear on the external side of the sealing interface. The sealing interface moves across the radial width of the seal rings from the external contaminant side toward the lubricant side as the wear progresses. Any fixed hydrodynamic geometry manufactured into the sealing faces at the lubricant side would limit the ability of the sealing interface to travel. As wear progresses, the seal will eventually begin to leak as the outer diameter of the sealing interface approaches the hydrodynamic geometry.

In the prior art mechanical seal of U.S. Pat. No. 5,487,550, a seal ring is formed with cutouts in its non-sealing side. In operation, a wave forms at the sealing surface from non-axisymmetric thermal and mechanical deformation caused by the non-uniform shape of the seal ring. The magnitude of this wave is dependent on the torque and temperature at the sealing face and the pressure differential across the seal. There would be no wave present to enhance sealing face lubrication if rotation slows or stops in service. Additionally, the seal is designed to produce a wave across the full width of the sealing interface, precluding a continuous sealing edge on the outer periphery of the seal ring to exclude abrasives.

It is very desirable to have a mechanical seal for rolling cutter rock bits with hydrodynamic wave geometry. This seal must have a surface finish smoother than 5 micro-inches RA and have a wave geometry that does not change significantly in magnitude in operation. This seal must also have the very outer peripheral portion of its sealing faces flat and parallel to exclude the ingress of abrasives. Finally, because even a tiny amount of lubricant leakage is potentially disastrous in a rock bit, the wave shape on the sealing faces must be very precisely formed.

BRIEF SUMMARY OF THE INVENTION

The present invention provides a mechanical seal for rotary rock bits with a uniquely formed hydrodynamic wave geometry on the sealing faces, which meets the above criteria. The faces are first manufactured flat and smooth, then upon assembly are elasticity deformed into a hydrodynamic geometry by the energizing system.

In the preferred embodiment this is accomplished by using a plurality of energizers which upon assembly load the mechanical seal ring at discrete locations. This causes controlled deformation on and adjacent to the dynamic sealing faces of one or both seal rings to achieve a hydrodynamic wave geometry while maintaining a flat sealing face on the outer periphery.

In another embodiment, a single piece energizer such as a wavy Belleville spring or an elastomer with an irregular cross section, forms an energizer for the mechanical seal rings. The resultant non-uniform loading causes deformations of the seal ring achieving hydrodynamic wave geometry on the seal face.

In still another embodiment a seal ring energizer has a series of bumps or ridges on the side of the seal ring which contacts the energizer. These ridges cause a variation in the force applied by the energizer to this seal ring when assembled, achieving a hydrodynamic wave geometry on the seal face.

In all the above embodiments, one or both of the mechanical sealing faces are lapped flat to less than about six helium light bands and polished to a minimum of about 5 microinch RA surface finish across the entire width of the sealing faces. After the smooth flat sealing surface is formed, the mechanical seal face elastically deforms into a hydrodynamic wave geometry. The typical deformation has a magnitude greater than about three helium light bands more than the original surface. The deformed surface maintains its finish of less than about five micro-inches RA. In each case the region of the sealing surface at the outer periphery of the seal does not have a wave geometry. Rather the portion of the seal face at the periphery is flat and parallel to its mating seal ring to exclude abrasives and eliminate lubricant leakage.

BRIEF DESCRIPTION OF THE DRAWINGS

FIG. 1 is a perspective view of a typical rolling cutter drill bit.

FIG. 2 is a cross section view through one leg of a rolling cutter drill bit with a face seal assembly of the preferred embodiment of the present invention.

DETAILED DESCRIPTION OF THE INVENTION AND THE PREFERRED EMBODIMENTS

Figure 3:
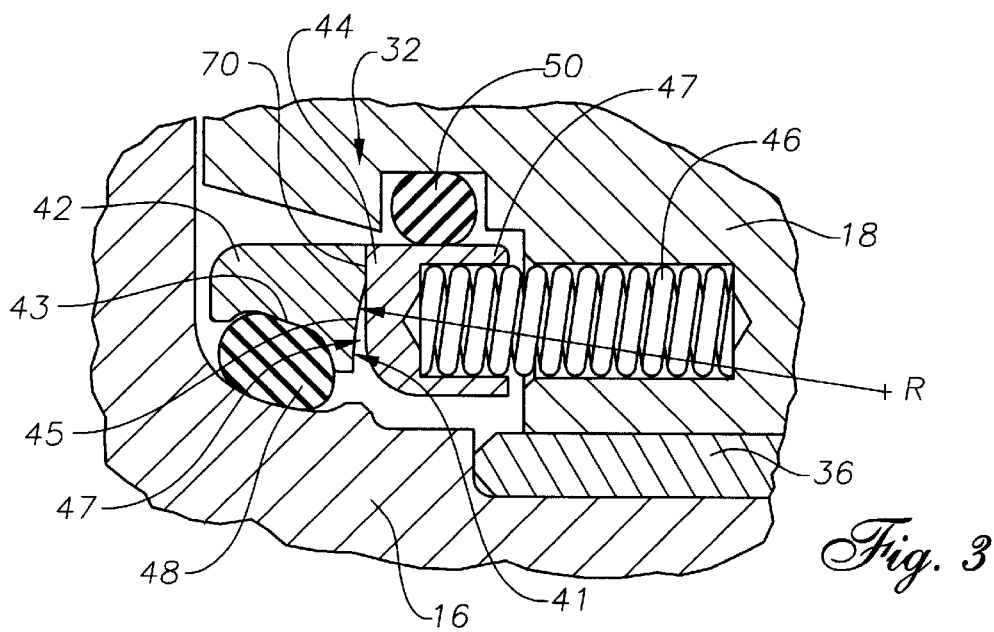
FIG. 3 is an enlarged cross section view of the preferred embodiment seal assembly shown in FIG. 2.

Referring now to the drawings in more detail, and particularly to FIGS. 1 and 2. A rolling cutter rock boring bit 10 includes a body 12 with a plurality of leg portions 14 attached to the body. A cantilevered bearing shaft 16 formed on each leg 14 extends inwardly and downwardly. A rolling cutter 18 is rotatably mounted upon the shaft 16. Attached to the rolling cutter 18 are hard, wear resistant cutting inserts 20 which engage the earth to effect a drilling action and cause rotation of the rolling cutter 18. A friction bearing member 36 is mounted between the bearing shaft 16 and a mating bearing cavity 38 formed in the cutter 18. This friction bearing 36 is designed to carry the radial loads imposed upon the cutter 18 during drilling. A retention bearing member 42 is mounted in the cutter 18 to retain the cutter 18 upon the bearing shaft 16 during drilling.

Internal passageways 22, 24, & 26, as well as a reservoir 28 and bearing area 30 of the leg 14, are filled with lubricant (not shown) during bit assembly. The lubricant helps reduce bearing friction and wear during bit operation and is dynamically sealed within the cutter 18 by a mechanical face seal assembly 32.

The pressure balancing diaphragm 34 equalizes the pressure between the drilling fluid and the lubricant and typically has a built in pressure relief means which releases lubricant into the drilling fluid when a predetermined pressure differential is reached. This is intended to protect the bearing seal 32 and pressure balancing diaphragm 34 against unintended rupture or damage.

Referring now to FIG. 3, the mechanical face seal assembly 32 is comprised of two generally cylindrical seal rings 42, 44 which are preferably formed of AISI 440C (UNS S44004) stainless steel, although many other materials are also suitable. Seal ring 42 is sealed with the bearing shaft 16 and also energized against its mating seal ring 44 by an elastomer ring 48. Since seal ring 42 does not rotate with respect to the bearing shaft 16 under normal operating conditions it is considered the stationary seal ring.

The rotating seal ring 44 is mounted within the cutter 18. In the preferred embodiment, this ring 44 is energized by a number of coil springs 46. An elastomer seal 50 prevents fluids from bypassing the rotating seal ring 44 while allowing the seal ring 44 to move axially.

In prior art metal face seals, great effort is expended to lap and polish the sealing faces so they remain flat during operation. To accomplish this, it is common in the mechanical seal industry to lap the sealing faces while they are axially loaded similarly to what is expected in operation. This practice, therefore, assures that the sealing faces are flat upon assembly and in operation.

For example, in the previously referenced prior art mechanical face seal of U.S. Pat. No. 4,838,365, (which has the same assignee as the present invention), a special fixture was made so the seal could be lapped under the loading conditions it experiences in operation. Each seal ring was lapped in a manner such that on assembly both sealing faces would be smooth, flat and parallel. In addition, the seal ring energized by the coil springs was designed to be as rigid and bulky as possible to avoid deformation in service.

Mechanical face seals with hydrodynamic features such as shown in U.S. Pat. Nos. 4,212,475; 4,836,561; and 5,496,047; as well as many others, are formed by removal of material from the seal faces either before or after lapping. In the present invention, however, one or both of the sealing rings are first lapped such that they are very smooth and flat. At least one of the seal rings are later elasticity deformed into a hydrodynamic wave geometry with a narrow, continuous, flat sealing face at the outer periphery of the seal face.

Figure 6:
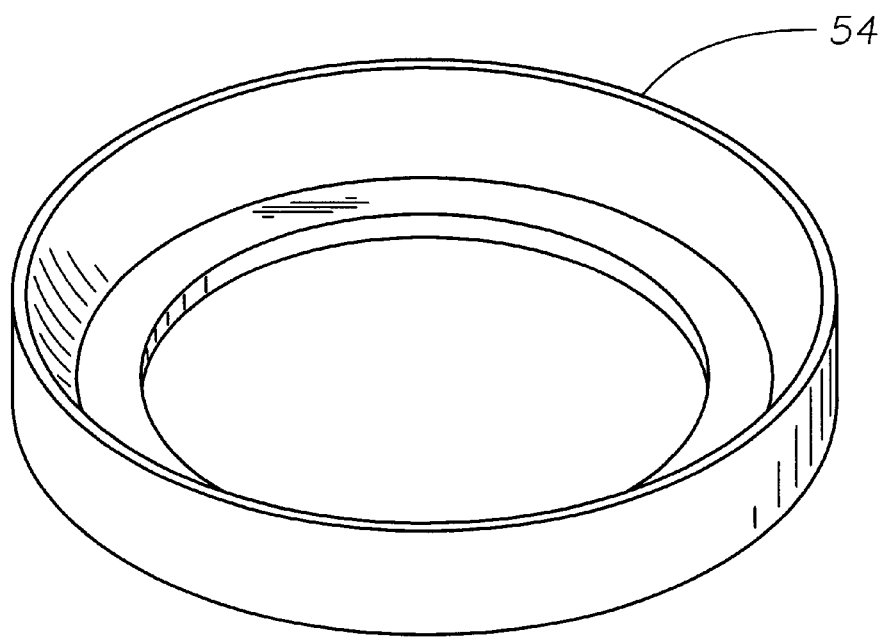
FIG. 6 is a perspective view of another embodiment of a mechanical seal ring of the present invention.
Figure 7:
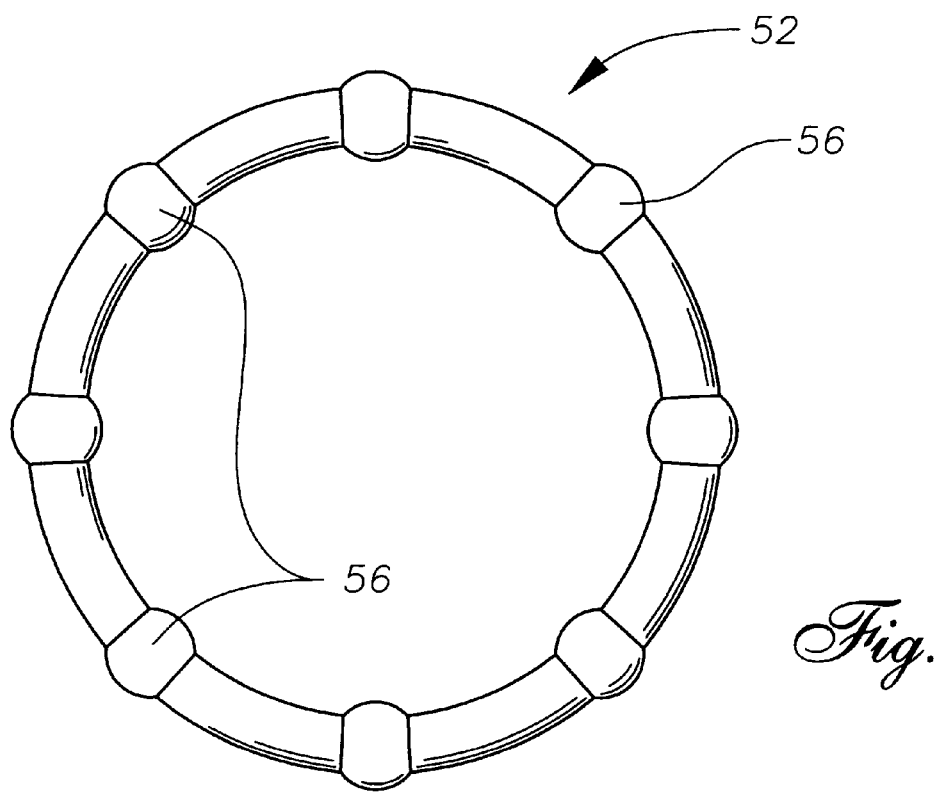
FIG. 7 is a top view of an energizer for use with the seal ring of FIG. 6.

As shown in FIGS. 6 and 7, one embodiment of the present invention provides elastic deformation at the seal face by non-uniformly loading the generally cylindrical seal ring 54 with the energizer 52. The single energizer 52 for the mechanical seal 54 is capable of applying a varying load to a seal ring 54 with uniform cross section. Energizer 52 resembles an O-ring except that it has a plurality of nodes 56 of greater cross sectional diameter. When assembled onto its seal ring 54, these nodes 56 will apply locally higher loads on the seal ring. This discrete loading causes the sealing face to elastically distort into a hydrodynamic wave geometry. For example, energizer 52 could be assembled with seal ring 54 onto the bearing shaft 16 in place of the seal ring 42 of FIGS. 3 and 4.

Alternately, a wavy Belleville spring could be used as an energizer in place of, or in addition to, the energizer 52. Many other variations and combinations of non-uniformly shaped elastomers, springs or other devices which cause uneven forces to be applied to a seal ring are also within the scope of this invention. All would comprise a single energizer which, upon assembly, is capable of applying a varying load to a seal ring with uniform cross section, causing an elastic deformation of the mechanical seal into a hydrodynamic wave geometry.

Figure 8:
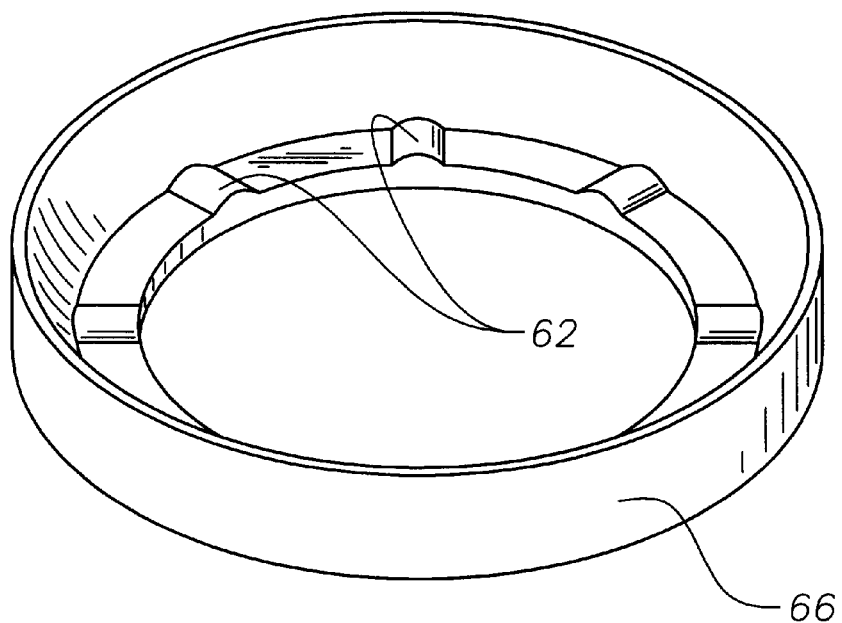
FIG. 8 is a perspective view of another embodiment of a mechanical seal of the present invention with a plurality of raised areas on the static sealing surface.

FIG. 8 shows another embodiment of the present invention. A generally cylindrical face seal ring 66 with a non-uniform static sealing surface uses a uniformly shaped energizer. The non-uniform surface, consisting of bumps or ridges 62, is located on the side of the seal ring 66 which contacts the energizer 48. These bumps or ridges 62 cause a variation in the force applied by the energizer to this seal ring 66 when assembled. The varying forces associated with properly designed bumps 62 again cause distortions of the sealing face, producing the desired hydrodynamic wave shape upon the seal face. An advantage of bumps 62 is that they are easier to build than non-uniform elastomers and static sealing is easier to accomplish. An added advantage of this design is that the ridges help prevent precession of the seal ring 66 on the bearing shaft 16 during operation.

In the preferred embodiment, the sealing face of a stationary seal ring is lapped flatter than about six helium light bands and polished to a minimum of about 5 micro-inch RA surface finish across its entire width. Referring again now to FIG. 3, the stationary ring 42 is provided with an energizer 48 which maintains a consistent energizing force at all circumferential locations. This may be accomplished, for example, by a conventional elastomeric O-ring.

In the following discussion, the dimensional and design data presented is typical for a mechanical face seal for 12-¼" sized drill bits. Although the details may vary with seals for other bit sizes, the design theory and operation of the face seals will be the same.

The sealing face 41 of the stationary ring 42 is made to have a flat, planar surface 70 at its outer periphery and a gradual tapered conical or spherical surface 45 at its inner diameter, as is customary in most prior art face seals. The outer diameter of the seal ring 42 is 3.470 inches and the spherical surface 45 has a radius R of 60 inches.

In order to manufacture this seal, the full width of the sealing face is first spherically lapped such that a surface finish of about 5 micro-inch or less is achieved. A second lapping operation is then performed on a flat lapping table, followed by a polishing operation to create a smooth, planar sealing surface 70 at the outer periphery of the sealing face. This creates a sealing face 41 on the seal ring 42 which has a flat sealing surface 70 at the outer periphery and a tapered inner portion 45. Upon assembly, the combination of the flat outer periphery 70 and the taper caused by radius R forms a very narrow gap G between the sealing faces adjacent to the inside diameter of the seal rings.

The inner surface 43 of seal ring 42 is grit blasted to form a very rough surface of from about 120 to 400 microinches RA which bears against the energizer 48 to resist rotation of the seal ring 42 with respect to the bearing shaft 16 during operation.

The rotating seal ring 44 is forced against the stationary ring 42 by a series of twelve coil spring energizers 46, spaced around the circumference of the ring 44 to apply load at discrete locations. Each coil spring is about 0.175 inches in diameter and has a spring rate of approximately 35 pounds per inch. The springs 46 are compressed so that each spring exerts about 7.5 pounds onto the rotating ring 44 at assembly.

The recesses 47 in the rotating seal ring 44 are each about 0.188 inches in diameter and about 0.142 inches in depth, not counting the drill point. The thickness of the rotating ring 44 is nominally 0.230 inches, so the recesses use up about 80% of the thickness of the seal ring 44.

The centers of the coil spring energizers 46 are positioned at a diameter of about 3.218 inches, which is smaller than the 3.350 inch outermost diameter of the sealing interface. This causes the seal ring 44 to flex slightly at the seal face 47, beginning at a diameter smaller than the outer periphery of the seal ring and continuing inward. The ring 44 flexes outward toward the stationary seal ring 42 into the gap G at discrete locations beneath the coil springs. The result of this flexing is the formation of a hydrodynamic wave geometry on the sealing faces similar to that shown in FIG. 5. An effective deformation typically has a magnitude greater than about three helium light bands.

Figure 4:
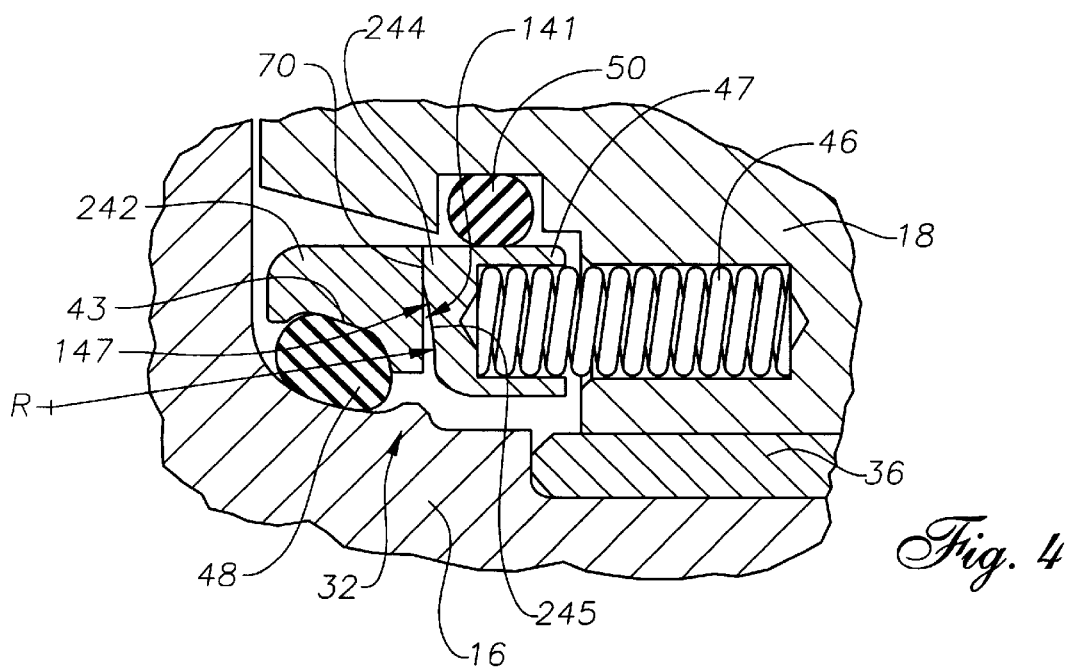
FIG. 4 is an enlarged cross section view of an alternate preferred embodiment seal assembly with a hydrodynamic wave geometry.
Figure 5:
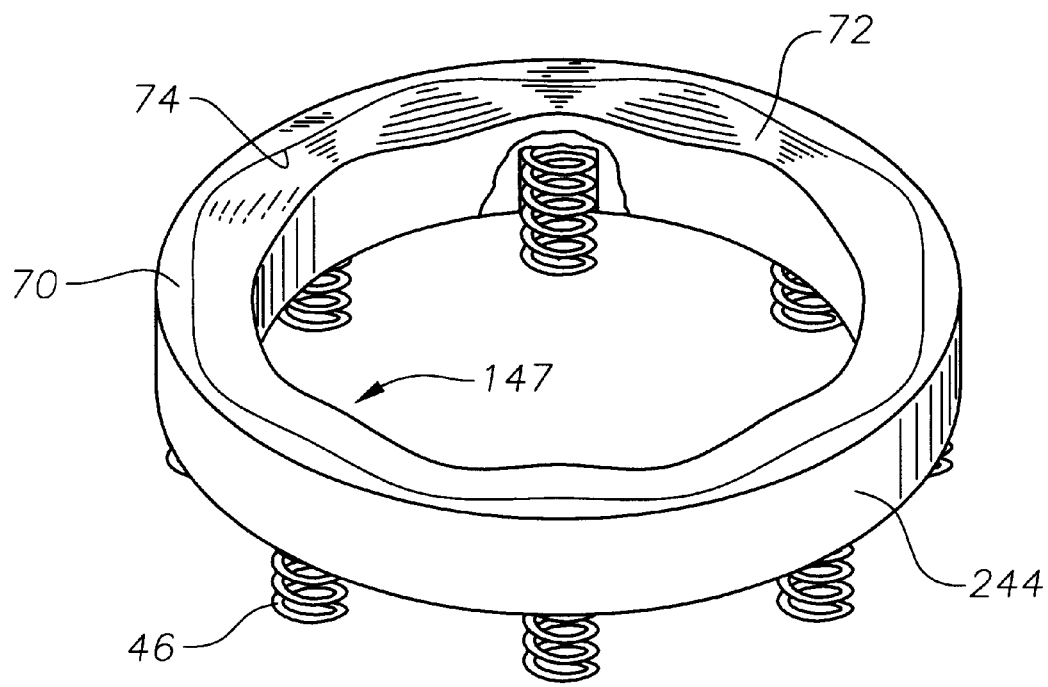
FIG. 5 is a perspective view of a preferred embodiment mechanical seal ring showing the hydrodynamic wave geometry.

An alternate preferred embodiment is shown in FIGS. 4 and 5. The difference between the designs shown in FIG. 4 and FIG. 3 is that the spherically lapped radius R2 is formed into the sealing face 147 of the rotating ring 244 rather than the stationary ring 242. In this case, the spherically lapped surface 245 defined by radius R2 is flexed toward the stationary seal ring 42, creating a wave pattern 72 on this surface, shown greatly exaggerated in FIG. 5. The sealing interface has a wave-shaped inner boundary 74 which oscillates with respect to the stationary ring 42 during rotation, delivering lubricant to the seal faces and causing a small amount of hydrodynamic lift.

The hydrodynamic geometry and the degree of lubrication it delivers can be controlled by the number of springs 46, the closure forces employed by each spring, and the radial placement of the springs. The stiffness of the rotating seal ring 44 can be changed to affect the amount of deformation and thereby the hydrodynamic action of the seal by adjusting its modulus or its cross-sectional geometry. The geometry of the sealing interface and the lubrication clearance between the seal faces are sensitive to changes in these variables. Care must be taken in using the proper combination of these variables to achieve a wavy sealing interface boundary at the lubricant side while maintaining a circular exclusionary boundary at the drilling fluid side.

An advantage of all the embodiments of this invention is that they employ conventional face seal manufacturing processes. Another advantage is that the geometry of the sealing interface undergoes minimal changes as the face wear progresses. As the sealing interfaces moves inward due to wear, its inner periphery maintains a hydrodynamic shape.

A still further advantage is that the degree of hydrodynamic activity is increased as the energizing force increases due to seal movement and ambient pressure changes. The hydrodynamic lubrication pressure increases when the seal faces are heavily loaded. Likewise, reduced deformation under a reduced energizing force creates less hydrodynamic pressure when seal face loading is reduced. This self-compensating action reduces leakage and seal face wear.

It would be readily apparent to one skilled in the art that there are many other combinations of seal rings and energizers which can be made and yet do not depart from the scope of the present invention. For instance a single piece seal ring/energizer combination could be made in a manner such that the sealing face deforms into a hydrodynamic wave shape at assembly or in operation.

In all cases, however, the one or both of the sealing rings are made such that the sealing faces are substantially smooth and flat while freestanding, and yet deform into a hydrodynamic wave geometry when assembled.

Whereas the present invention has been described in particular relation to the drawings attached hereto, it should be understood that other and further modifications apart from those shown or suggested herein, may be made within the scope and spirit of the present invention.

What is claimed:

1. A rolling cutter rock boring bit comprising: a body, a leg attached to the body, a bearing shaft formed on the leg, a rolling cutter rotatably mounted on the bearing shaft, a lubricant disposed between the rolling cutter and the bearing shaft, and a mechanical face seal means mounted between the rolling cutter and the bearing shaft to seal the lubricant within the rolling cutter, wherein the mechanical face seal means comprises at least one generally cylindrical seal ring and a means for energizing the seal ring, the seal ring having a sealing face, whereby the seal ring is deformed upon assembly by the means for energizing the seal ring to create alternating peaks and depressions on the sealing face.

2. The rolling cutter rock boring bit of claim 1 wherein the sealing face comprises an outer periphery and an inner portion, the outer periphery has a flatness less than six helium light bands, and the alternating peaks and depressions are on the inner portion to effect hydrodynamic lubrication of the sealing face as the rolling cutter rotates.

3. The rolling cutter rock boring bit of claim 2 wherein the sealing face has a roughness of five micro-inch RA or less.

4. The rolling cutter rock boring bit of claim 2 wherein the inner portion is tapered.

5. The rolling cutter rock boring bit of claim 2 wherein the inner portion has a spherical radius.

6. The rolling cutter rock boring bit of claim 1 wherein means for energizing the seal ring comprises a plurality of coil springs.

7. The rolling cutter rock boring bit of claim 1 wherein the means for energizing the seal ring comprises an elastomeric packing ring with a generally circular cross-section and wherein the seal ring has a plurality of bumps which contact the means for energizing the seal ring to cause a variation of the force applied by the energizer to the seal ring.

8. The rolling cutter rock boring bit of claim 1 wherein the means for energizing the seal ring comprises an elastomeric O-ring with a plurality of nodes which co-act with the seal ring to provide locally higher loads upon the seal ring.

9. A rolling cutter rock boring bit comprising: a body, a leg attached to the body, a bearing shaft formed on the leg, a rolling cutter rotatably mounted on the bearing shaft, a lubricant disposed between the rolling cutter and the bearing shaft, and a mechanical face seal means mounted between the rolling cutter and the bearing shaft to seal the lubricant within the rolling cutter, wherein the mechanical face seal means comprises a pair of generally cylindrical seal rings and a means for energizing the seal rings, each of the seal rings having a sealing face, whereby at least one of the seal rings is deformed upon assembly by the means for energizing the seal rings to create alternating peaks and depressions on the sealing face effective for hydrodynamic lubrication of the sealing face as the rolling cutter rotates.

10. The rolling cutter rock boring bit of claim 9 wherein the sealing face of at least one of the seal rings comprises an outer periphery and an inner portion, the outer periphery has a flatness less than six helium light bands, and the alternating peaks and depressions are on the inner portion to effect hydrodynamic lubrication of the seal face as the rolling cutter rotates.

11. The rolling cutter rock boring bit of claim 10 wherein the sealing face has a roughness of five micro-inch RA or less.

12. The rolling cutter rock boring bit of claim 10 wherein the inner portion is tapered.

13. The rolling cutter rock boring bit of claim 10 wherein the inner portion has a spherical radius.

14. The rolling cutter rock boring bit of claim 9 wherein the means for energizing the seal ring comprises a plurality of coil springs.

15. The rolling cutter rock boring bit of claim 9 wherein the means for energizing the seal ring comprises an elastomeric packing ring with a generally circular cross-section and wherein the seal ring has a plurality of bumps which contact the means for energizing the seal ring to cause a variation of the force applied by the energizer to the seal ring.

16. The rolling cutter rock boring bit of claim 9 wherein the means for energizing the seal ring comprises an elastomeric O-ring with a plurality of nodes which co-act with the seal ring to provide locally higher loads upon the seal ring.

* * * * *